United States Patent
Baatout et al.

(10) Patent No.: US 11,790,031 B1
(45) Date of Patent: Oct. 17, 2023

(54) WEBSITE CHANGE DETECTION

(71) Applicant: Content Square SAS, Paris (FR)

(72) Inventors: Mohamed-Amine Baatout, Paris (FR); Sihem Abdoun, Paris (FR); Paul Coursaux, Paris (FR); Mohamed Ali Fathallah, Paris (FR); Oliver Maillot, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/977,688

(22) Filed: Oct. 31, 2022

(51) Int. Cl.
*G06F 17/00* (2019.01)
*G06F 16/958* (2019.01)
*G06F 16/951* (2019.01)

(52) U.S. Cl.
CPC .......... *G06F 16/958* (2019.01); *G06F 16/951* (2019.01)

(58) Field of Classification Search
CPC .............................. G06F 16/958; G06F 16/951
USPC ........................................................ 715/234
See application file for complete search history.

(56) References Cited

U.S. PATENT DOCUMENTS

| | | | | |
|---|---|---|---|---|
| 8,225,197 B1 * | 7/2012 | Szewczyk | ............. | G06F 16/951 715/241 |
| 8,555,157 B1 * | 10/2013 | Fu | ......................... | G06F 16/972 715/201 |
| 9,172,712 B2 * | 10/2015 | Sheleheda | ........... | H04L 61/4511 |
| 11,561,962 B2 * | 1/2023 | Abdoun | ................ | G06F 16/958 |
| 11,567,858 B2 * | 1/2023 | Hwang | ............... | G06F 11/3688 |
| 2011/0083185 A1 * | 4/2011 | Sheleheda | ........... | H04L 65/4025 709/224 |
| 2013/0097702 A1 * | 4/2013 | Alhamed | ................ | G06F 21/64 726/22 |
| 2014/0304588 A1 * | 10/2014 | Li | ......................... | G06F 16/9577 715/234 |
| 2015/0012811 A1 * | 1/2015 | Chan | ..................... | G06F 16/958 715/234 |
| 2016/0170953 A1 * | 6/2016 | Maddali | ................ | G06F 16/986 715/234 |
| 2016/0188138 A1 * | 6/2016 | Chen | ..................... | G06F 16/957 715/777 |
| 2016/0335366 A1 * | 11/2016 | Zhang | .................. | G06F 16/9566 |
| 2017/0032494 A1 * | 2/2017 | Yuan | ...................... | G06F 40/143 |
| 2017/0206283 A1 * | 7/2017 | Harpur | .................. | G06F 16/957 |
| 2017/0357624 A1 * | 12/2017 | Punjabi | ................. | G06F 40/103 |
| 2020/0410032 A1 * | 12/2020 | Huang | .................. | G06F 16/953 |
| 2020/0410034 A1 * | 12/2020 | Huang | ............... | H04N 21/4316 |
| 2021/0004628 A1 * | 1/2021 | Chen | ....................... | G06V 20/62 |
| 2021/0049779 A1 * | 2/2021 | Harviainen | ............... | G06T 7/38 |
| 2022/0027340 A1 * | 1/2022 | Abdoun | ............. | G06F 16/2365 |
| 2022/0043879 A1 * | 2/2022 | Trigalo | .................. | G06N 20/00 |

* cited by examiner

*Primary Examiner* — Manglesh M Patel
(74) *Attorney, Agent, or Firm* — Schwegman Lundberg & Woessner, P.A.

(57) ABSTRACT

Systems and techniques may be used for providing website change detection. An example technique may include processing snapshots of a website, for example on a first day and a second day to produce a set of features of the website. The technique may include comparing at least one of the set of features from the first day to at least one of the set of features from the second day, for example using a distance function. A change score may be determined, the change score corresponding to at least one of a deleted feature, an added feature, or an unchanged feature of the website from the first day to the second day. The technique may include outputting the change score (e.g., for display).

20 Claims, 10 Drawing Sheets

WEBSITE CHANGE DETECTION

BACKGROUND

Web commerce has become a nearly universal way to sell products. Managing web commerce websites is often done by a team of people, who use web analytics to make design, structural, and interactive choices for the web commerce websites. Sales data from a website may be used to determine whether a product is successful. However, the sales data does not tell the entire story, nor does it provide sufficient data to make proactive decisions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Systems and techniques described herein perform website change detection, for example to notify a user when a website has changed its structure. These systems and techniques may compare two snapshots of a website, for example at different times, on different days, etc. The comparison may include a feature-by-feature comparison of features of the two snapshots to determine whether a change has occurred. For example a distance function may be used to evaluate feature changes from one snapshot to the other. A change score may be determined using the distance function, the change score representing changes such as a deleted feature, an added feature, or an unchanged feature of the website from one snapshot to the other. The change score may be used to indicate whether a change has occurred, for example by comparing the change score to a threshold.

Merchants and website owners or operators typically want to know statistical information about items that are presented or sold on a website. This statistical information may be specific to where the items appear on the website, including what items are near each other, what items are initially visible or hidden, what items are clicked on, what items are purchased or selected, etc. However, a technological problem arises, particularly in aggregating or comparing these types of statistical information, when the website changes structurally (e.g., when a feature of the website is changed). When a structural change to the layout of the website occurs, it may be difficult or not useful to compare statistical information from the new layout to the old layout. This technological problem is solved by the technical solutions described herein that determine changes to a website.

The systems and techniques described herein provide a technical solution to the problem of determining changes in a layout of a website. The layout change detection is distinct from content change detection, which may be used to determine changes to text, images, etc. within a particular layout. In some examples, both layout and content may change, while in others only content or only layout may change.

In some examples described herein, a snapshot is discussed (e.g., a comparison between two snapshots). A snapshot is a static version of a webpage that has been displayed, rendered, or output (e.g., displayed on at least one user device at a point in time during a session). A snapshot may be captured, logged, or stored at various points in time throughout a day, for example.

In some examples, a website has different layout versions, such as a first layout for a mobile device and a second layout for a laptop or desktop computer. In an example, layout versions may differ even for a single type of device. For example, depending on a user visiting the same alias, page or URL, the website output may change (e.g., for a logged in user versus a not logged in user, based on a location such as country or state, etc.).

Networked Computing Environment

Figure 1:
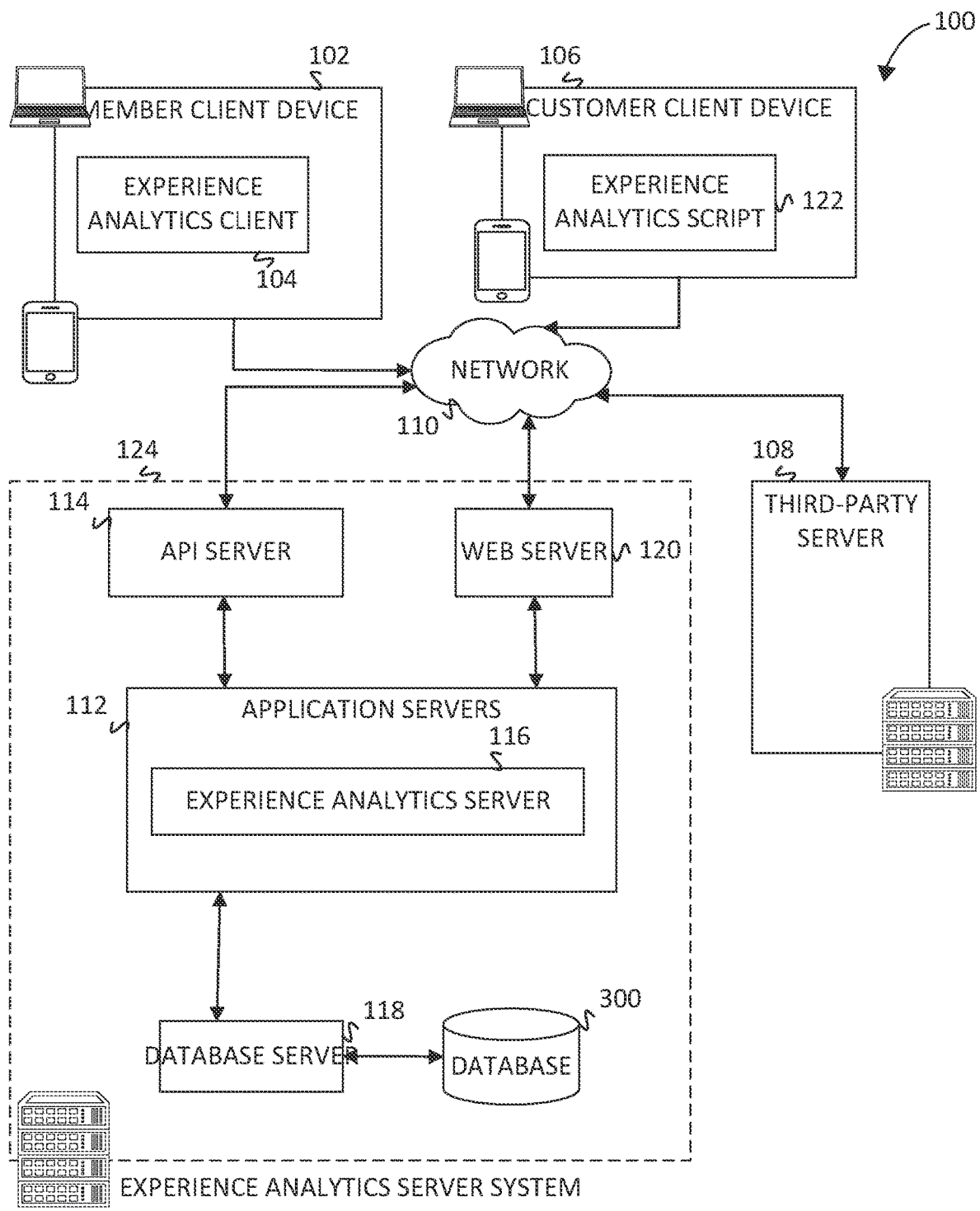
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
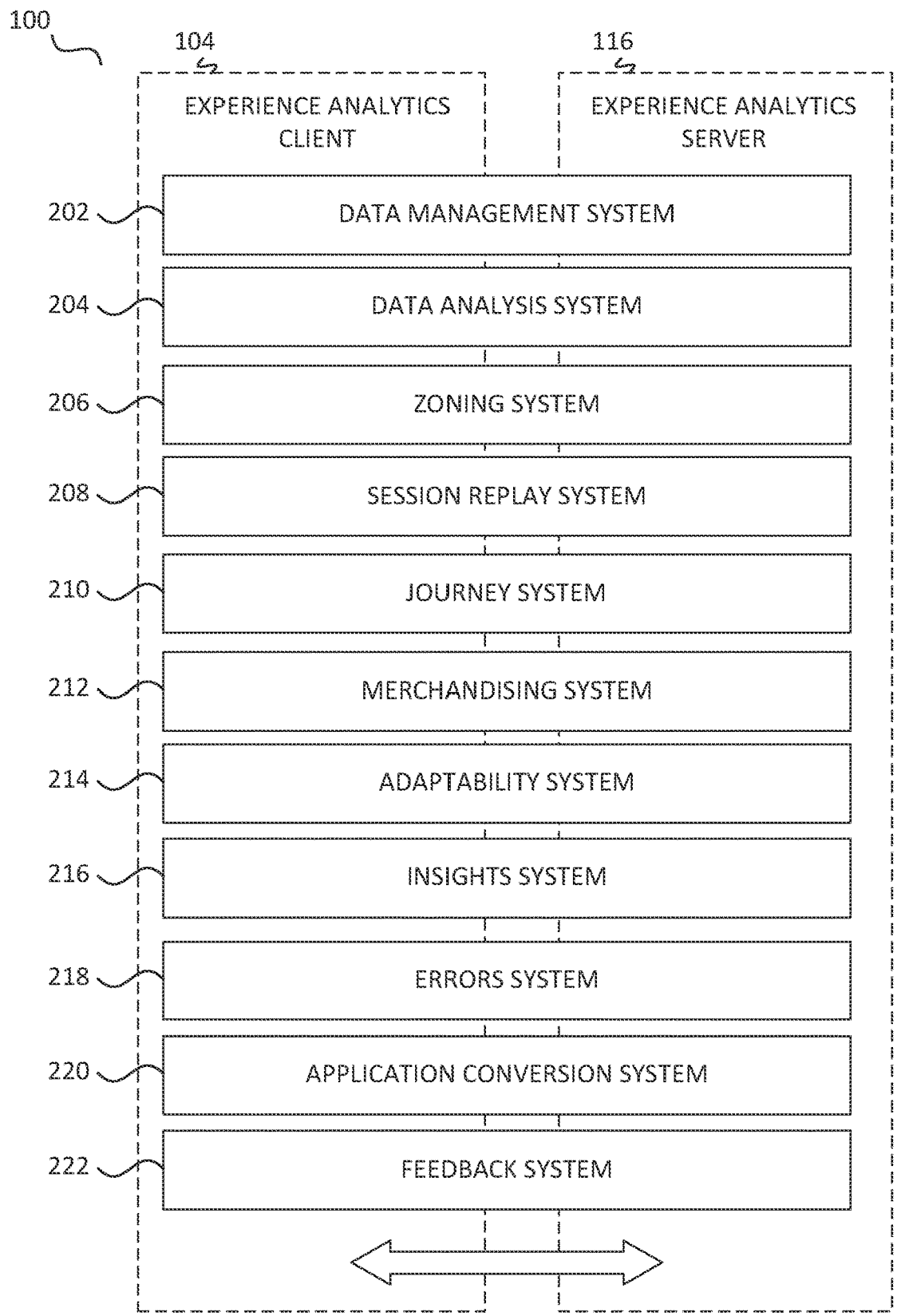
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104.

Data Architecture

Figure 3:
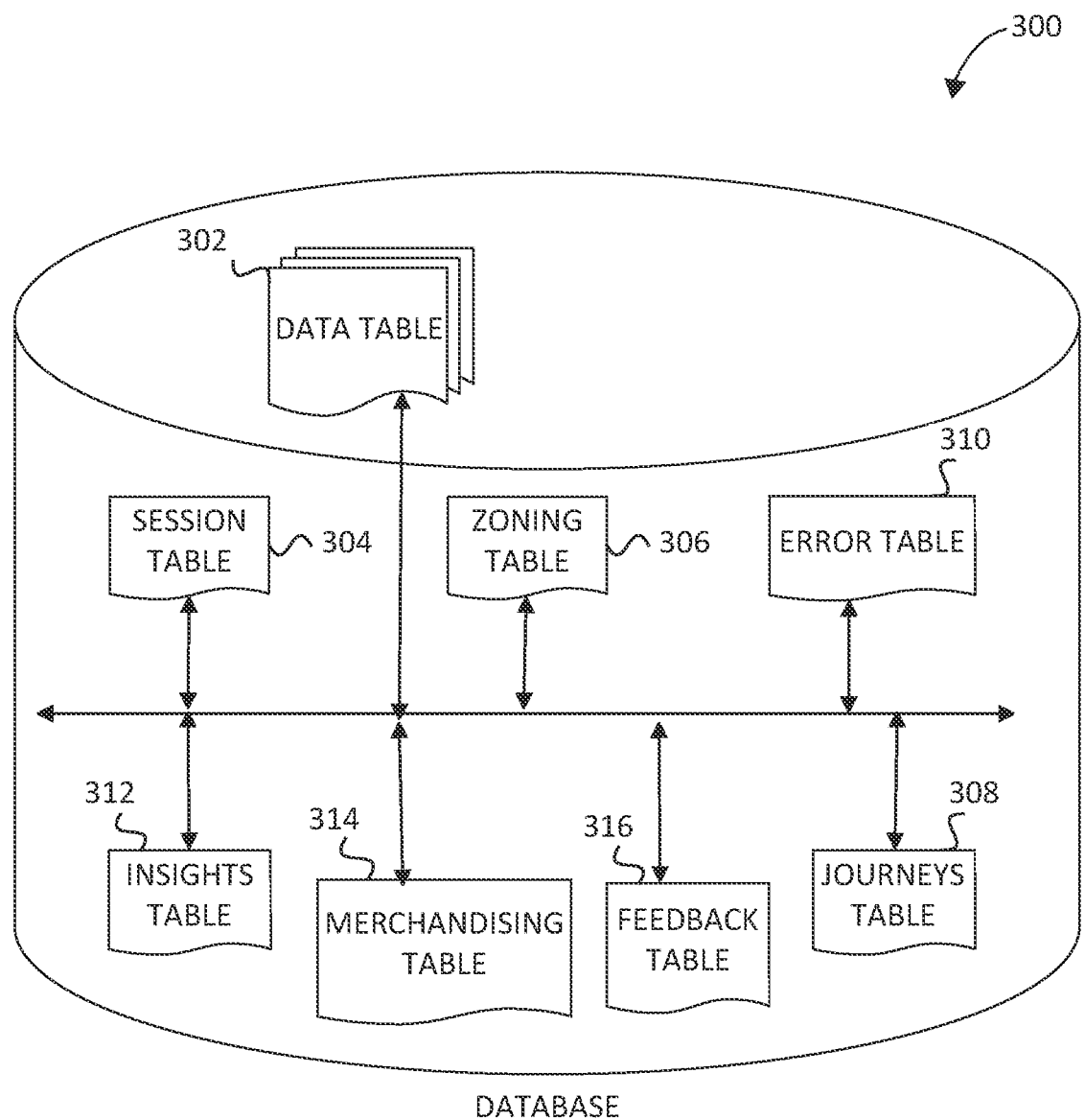
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

The data table 302 may store layout change information as described herein. For example, the data table 302 may store change scores for features or an overall change score a website. The data table 302 may store a changelog or graph, as described herein below.

Technique for Website Change Detection

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
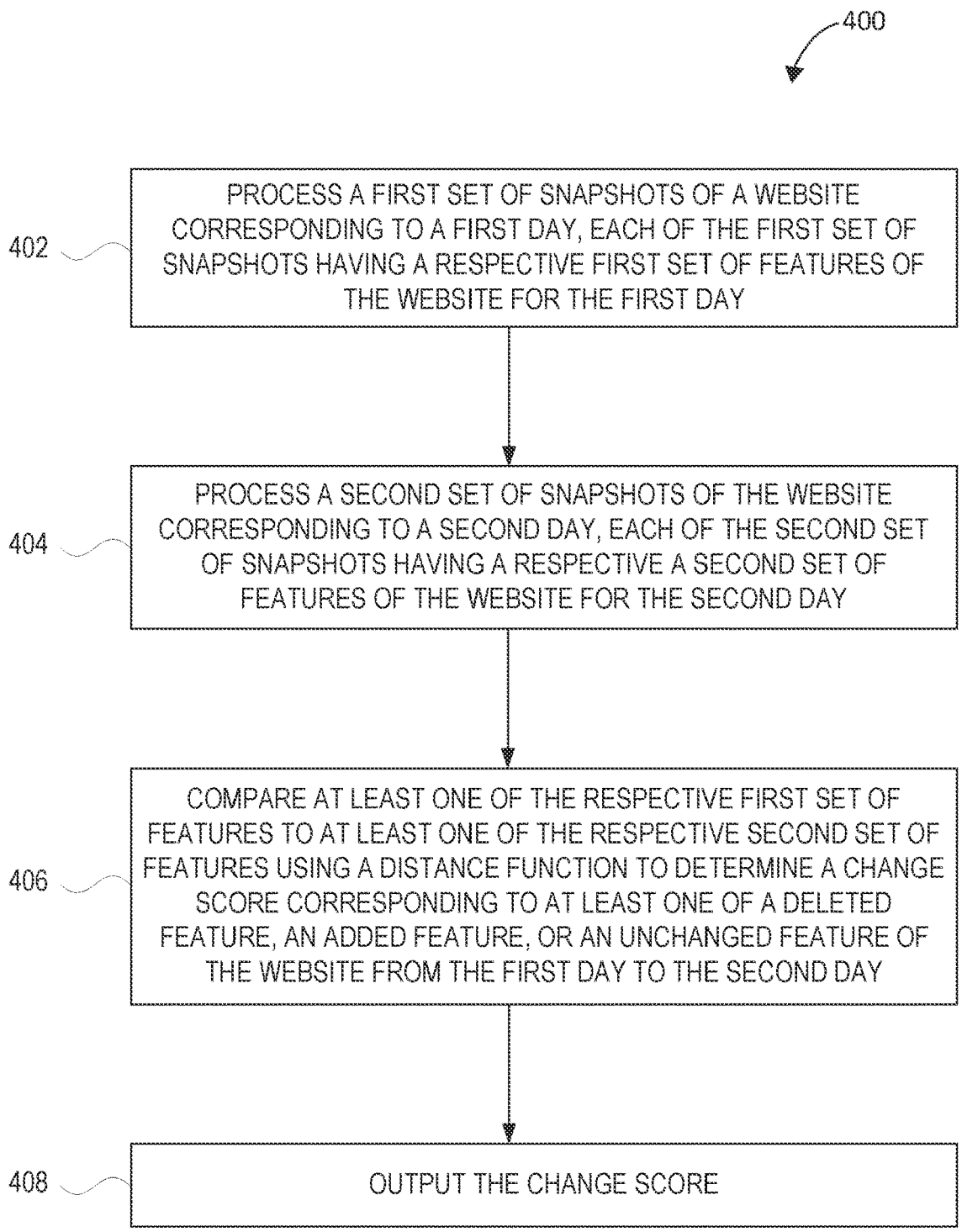
FIG. 4 illustrates a technique 400 in accordance with an example.

FIG. 4 illustrates a technique 400 in accordance with an example. The technique 400 may be used to detect changes to a website.

The technique 400 includes an operation 402 to process a first set of snapshots of a website corresponding to a first day, each of the first set of snapshots having a respective first set of features of the website for the first day. The technique 400 includes an operation 404 to process a second set of snapshots of the website corresponding to a second day, each of the second set of snapshots having a respective a second set of features of the website for the second day. Features of operation 402 or 404 may include features identified from HTML code of the website, such as using a DOM tree. The features may include text, frames, images, etc. The first or second set of snapshots of the website may be captured at different times during the first or second day, respectively (e.g., once every hour, once every few hours, etc.). The respective first set of features or the respective second set of features may correspond to features visible on the website (e.g., only visible features), such as when the website is initially loaded. In this example, initially hidden features maybe disregarded (e.g., filtered out).

The technique 400 includes an operation 406 to compare at least one of the respective first set of features to at least one of the respective second set of features using a distance function to determine a change score corresponding to at least one of a deleted feature, an added feature, or an unchanged feature of the website from the first day to the second day. The technique 400 may use a hash function for each feature of the respective first set of features and the respective second set of features (e.g., for use as an identifier, to compare a feature to another feature, etc.). In an example the distance function compares respective hash values for each feature of the respective first set of features to respective hash values for the respective second set of features. In some examples, the distance function may be calculated by determining a first sum comprising: a sum of an area of deleted features from the respective first set of features plus a sum of an area of inserted features from the respective second set of features, determining a second sum comprising: a sum of areas of all features of the respective first set of features plus a sum of areas of all features of the respective second set of features, and dividing the first sum by the second sum.

Operation 406 may include comparing each of the respective first set of features to each of the respective second set of features to determine a set of change scores. In this example, the change sore may be selected from the set of change scores (e.g., a minimum change score in the set of change scores). In some examples, determining the change score may include using minimum distance pairs between features of each of the respective first set of features to each of the respective second set of features. For example, with three snapshots for the first day and three for the second day, there may be up to nine distances for a particular feature appearing on the first day. The minimum distance of those nine distances may be used to prevent incidental or temporary changes from affecting the ultimate change score.

The technique 400 includes an operation 408 to output the change score. Operation 408 may include generating a graph of change scores over time, and outputting the graph for display, such as on a user interface. Operation 408 may include generating a changelog indicating changed features. In some examples, a subset of the changed features from the changelog may be displayed or otherwise output based on a distance threshold corresponding to the changed features. The distance threshold may include a default (e.g., only using changes above a minimum threshold to filter out minor changes) or may be set by a user (e.g., only including large changes).

Machine Architecture

Figure 5:
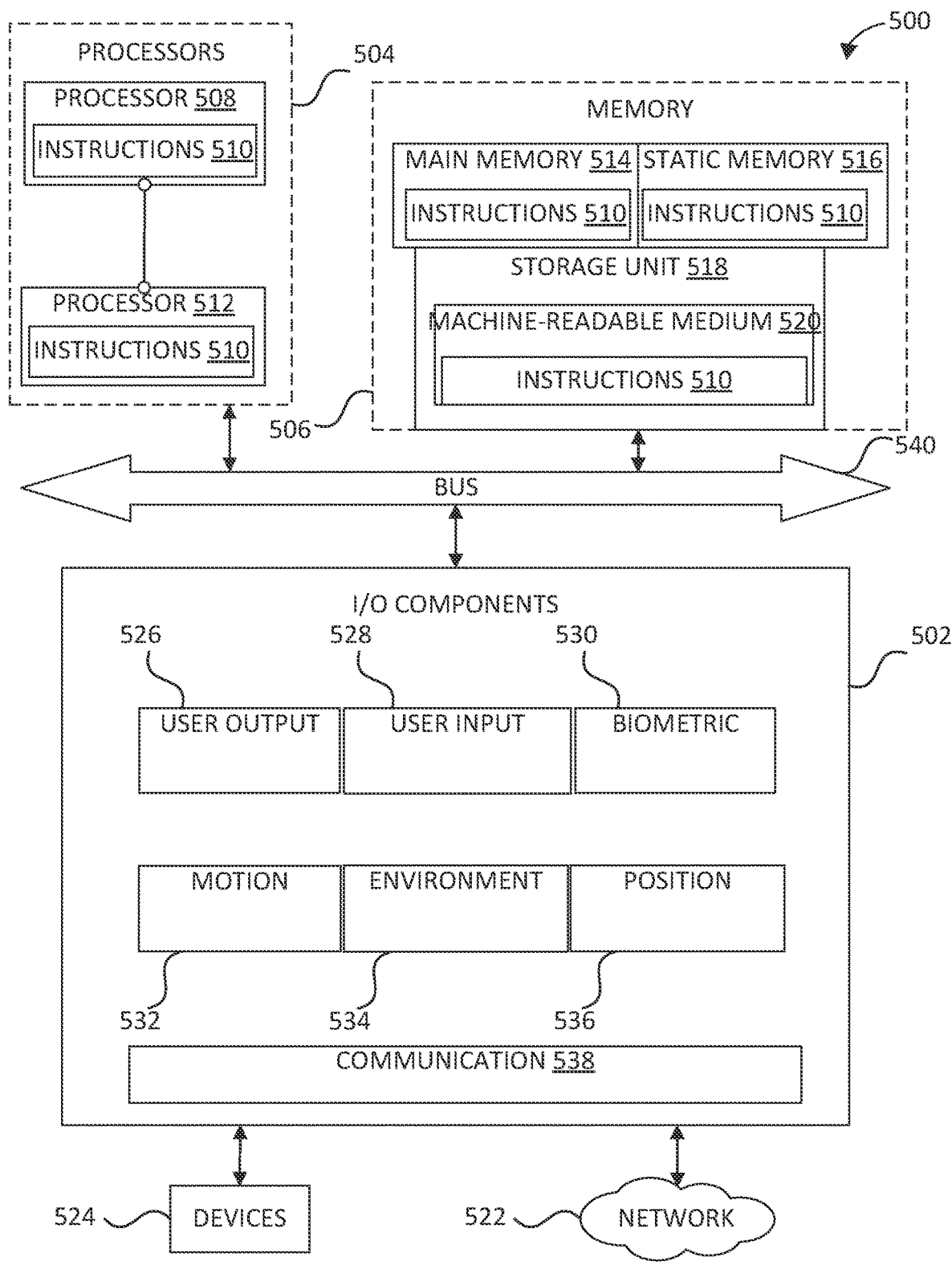
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional0 bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
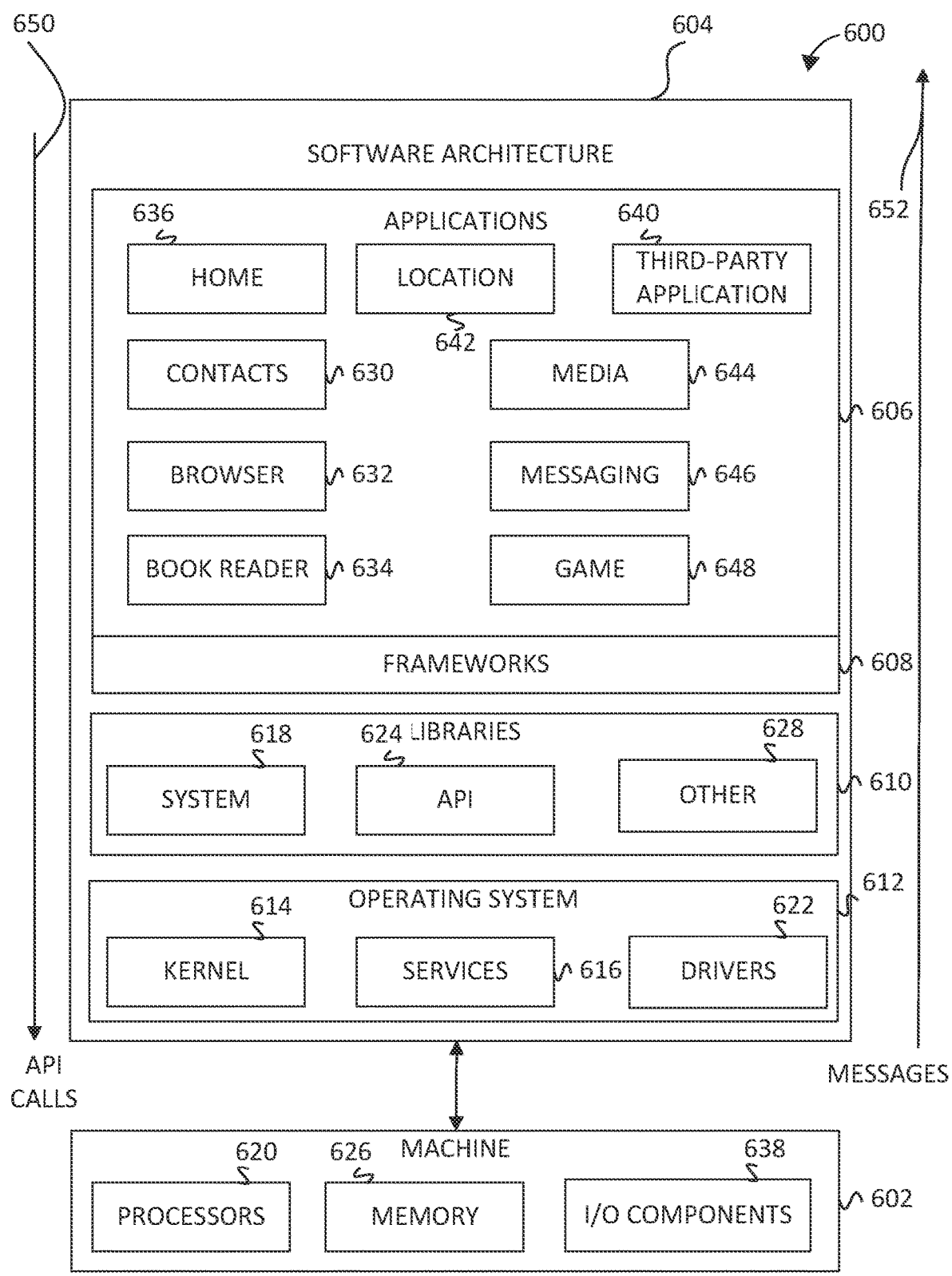
FIG. 6 is a block diagram showing a software architecture within which examples may be implemented.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Website Change Detection Block Diagrams

As discussed above, a snapshot may include a static version of a webpage that has been seen by some user at some point of time during a session. Snapshot data may be defined as a collection of DOM tree data, snapshot image, and zones list (e.g., a list of zones with each zone's features). A webpage layout may include a visual architecture of a webpage, and how its components are organized. In some examples, HTML or CSS code of a website may be used to capture this structural information. In an example, DOM Tree object data may be used. The structural information may be output in a linear representation in some examples, such as with a list of zones for each snapshot.

A website may be dynamic, for example having a different layout depending on various factors of how or when the website is accessed (e.g., depending on user device type, time of day, location, login status, etc.). In an example, an e-commerce website home page may have a single URL alias, such as alias: Homepage to urls list: 1. example_ecoormece.com/homepage. This website may have a large variety of products and different ways those products are displayed (e.g., may include randomly displayed, such as from a set of predefined options). In some examples, from a user to another user, the website may have different versions.

Based on snapshot comparison, a few different outcomes may occur. For example, two snapshots may be from a same day, and in this case each one is considered as a version and therefore not a change. This results in identifying different website versions, which may be useful for identifying what time of day or operating conditions to capture the website for future snapshots. A layout change, in some examples, is indicated only when there is a change between different dates (e.g., intraday changes are ignored as being different versions).

In another example, when two snapshots are in different dates, a change may be detected when a change occurs. In some examples, multiple snapshots from each of two days may be considered to determine whether there is a change or merely two different versions were captured. All versions for each of two dates may be considered. For example, multiple snapshots may be captured and compared for each of the two days. When no common version is found, a change may be indicated.

Equation 1 below is an example rule for determining whether a website has a change based on snapshots on two different days:

$$\text{let web}(t) = \qquad \text{Eq. 1}$$

$(s_1, \ldots, s_u, t)$ be the set of snapshots of an alias of one day $t$ and $ver_{web}(t) = (v_1, \ldots, v_k, t)$ the set of its versions where $k <= n$ let $lcd(t_1, t_2) \rightarrow$ $\{0, 1\}$ be the layout change function between two dates $t_1$, $$t_2 \in \mathbb{N}^* lcd(t_1, t_2) = \begin{cases} 1 & \text{if} \quad ver_{web}(t_1) \cap ver_{web}(t_2)) \neq \emptyset \\ 0 & \text{else} \end{cases}$$

Similar to the different layout versions explained above, dynamic layouts for a website may provide many different versions of a website in a day. Dynamic layouts are also not automatically considered to be a change. Some pages or aliases may have a part of their canvas that is dynamic, which means that depending on the visitor, device, time of day, or the user interactions, a part or all of a page may change. The difference from one dynamic layout to another for a website may follow a pattern in some examples (e.g., a different length of a list of products for example). In dynamic layout websites, a general layout of the page may stay constant.

Two examples of dynamic layouts include product pages and cart pages. A dynamic layout website may have a template in some examples. Some products have more photos, more comments, specific sections that are related and which need more space, or the like, which may result in different page arrangements. These changing aspects may be indicated as part of a dynamic layout of the page. These changes include content and part of the visual layout, but are not a part of a layout change because the general layout or template is still the same. In another example, a dynamic layout part may include a list of products in the cart, which depends on the user (e.g., how many items were added to the cart). The list of items may be longer or different, but that does not indicate a change to the layout of the website.

Figure 7:
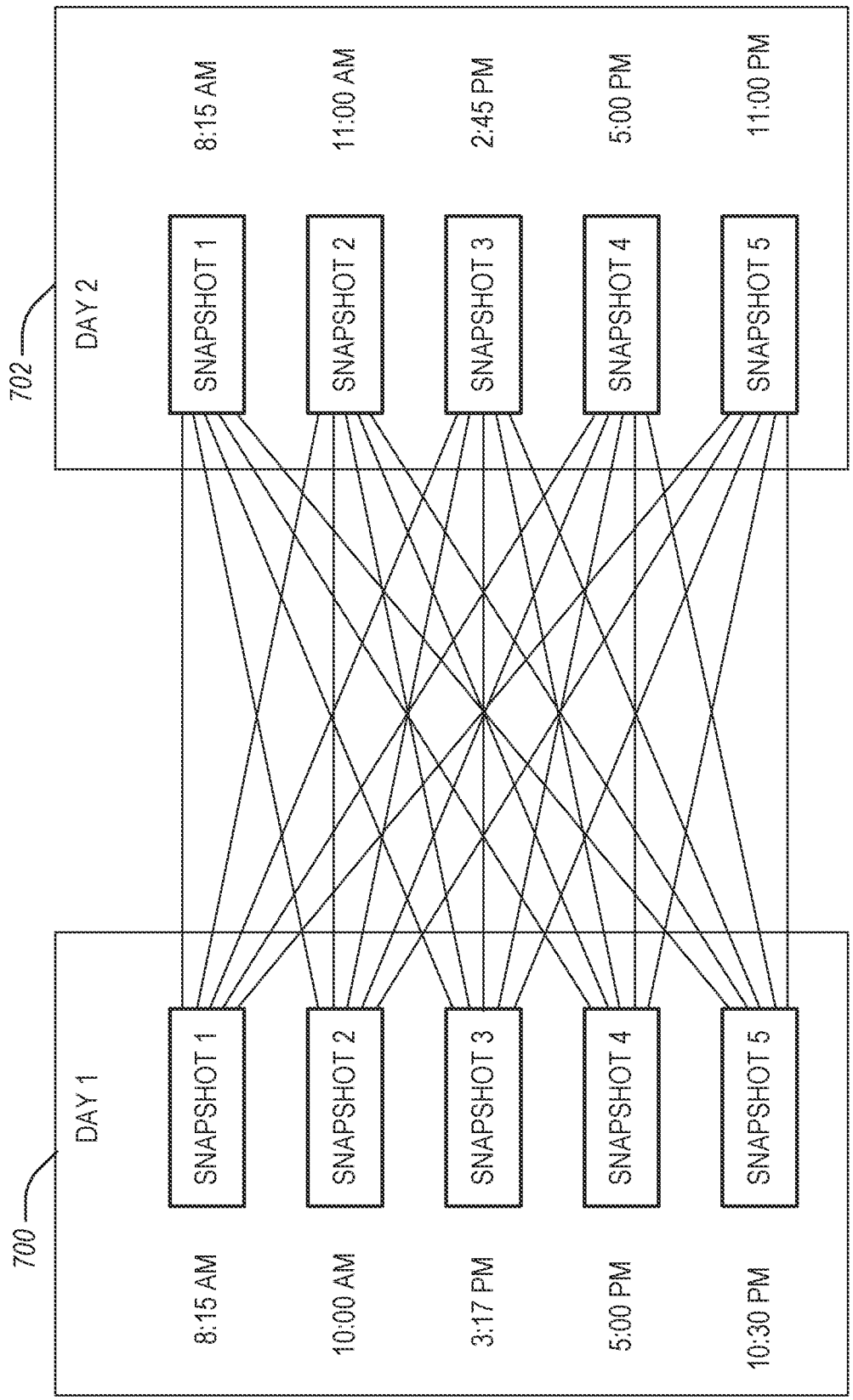
FIG. 7 illustrates a block diagram showing website snapshot comparisons in accordance with some examples.

FIG. 7 illustrates a block diagram showing website snapshot comparisons in accordance with some examples. FIG. 7 shows snapshots captured on two days, a first day 700 and a second day 702. While the two days are shown with the same number of snapshots for illustration purposes, in other examples one of the two days may have more snapshots than the other. The snapshots are shown with a corresponding capture time, indicating when or generally when the snapshot was taken. In some examples, snapshots may be taken at exactly the same time during each of the two days (e.g., snapshot 4), but this is not necessary (e.g., snapshots 2 and 3 are taken at different times in the first day 700 and the second day 702).

As shown in FIG. 7, each snapshot from the first day 700 may be compared to each snapshot of the second day 702. For the example given of five snapshots per day, that results in twenty-five comparisons. Each of these comparisons may include a feature by feature comparison, which may be combined, as described below, for an overall change score. The overall change score for each pair of features from each of the snapshots from the first day 700 to the second day 702 may be assessed to determine a lowest score for each feature, as discussed further below.

Figure 8:
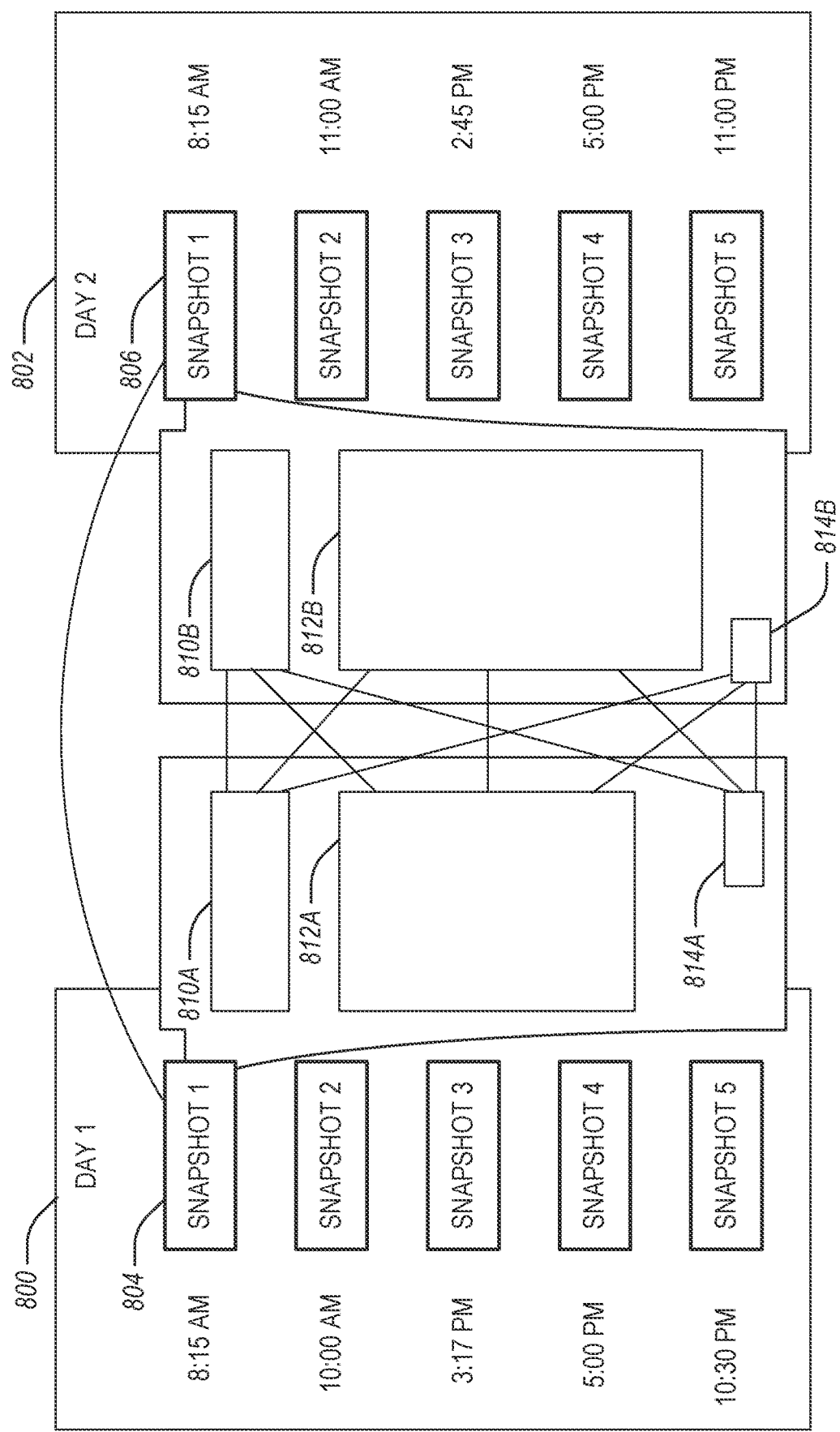
FIG. 8 illustrates a block diagram showing snapshot feature comparisons in accordance with some examples.

FIG. 8 illustrates a block diagram showing snapshot feature comparisons in accordance with some examples. FIG. 8 includes snapshots on a first day 800 and a second day 802, which may be similar or the same as those described with respect to FIG. 7. The snapshots on the first day 800 include a snapshot 804, which is shown with its features 810A, 812A, and 814A. The snapshots on the second day 802 include a snapshot 806, which is shown with its features 810B, 812B, and 814B. While these snapshots are shown with a few features, as few as a single feature or many more features may be present on a snapshot. The snapshots features are labeled with A and B designations for illustrative purposes, in some examples the features may be different (e.g., feature 814A and 814B may not be related or include any of the same information).

In an example, the features of the snapshot 804 are compared to the features of the snapshot 806 to see if there has been a change in layout. Each feature of snapshot 804 may be compared to each feature of snapshot 806. For example, feature 810A may be compared to feature 810B, 812B, and 814B. For the three features shown in each of snapshots 804 and 806, this results in nine comparisons, for example. The comparison may include calculating a distance from a feature in snapshot 804 to a feature in snapshot 806. For example, feature 810A may have a distance change of zero when compared to snapshot 810B, and a large distance when compared to snapshot 814B. A minimum distance of the set of distances may be used to determine a feature change score for the feature. A hash function may be used for each zone or area of the snapshots, such as 810A to encode nodes in a set of hash values. A list of hashes (e.g., by encoding the features) for each of snapshots 804 and 806 may be generated. These hashes values may be compared to match how many areas have been inserted, deleted, or kept the same between both snapshots 804 and 806. A distance formula may be used for combining the hash matching results, and features to get an overall change score between the two snapshots 804 and 806.

In the example of FIG. 8, for feature 810A the feature change score may be zero, since feature 810B is in the same location as feature 810A. Feature 814A may have a larger distance score, since it has appeared to move from snapshot 804 to a new location as feature 814B in snapshot 806. An overall change score may be determined for the snapshot 804 to snapshot 806 comparison by summing the minimum feature change scores for each feature in either snapshot 804 or snapshot 806. In some examples, a determination of whether the website has changed from the first day 800 to the second day 802 may be determined using one or more overall change scores from snapshot pairs. For example, an average overall change score, a minimum overall change score, a maximum overall change score, or the like may be used for the day to day comparison. In some examples, a threshold (e.g., a minimum day to day change score) may be used to determine whether a layout change has occurred.

In an example, a normalized distance value between 0 and 1 may be calculated between two snapshots. The data for calculating the distance value may be extracted by transforming a snapshot into a list of nodes with a set of features, for example in a tabular form. In some examples, all nodes of a DOM tree are parsed. Invisible nodes may be removed and not used as input for distance calculations in some examples. After capturing nodes, each node may be hashed, for example based on a set of input features. Nodes may be matched from two snapshots, for example based on node value or node hash (e.g., feature 810A and feature 810B may be matched based on one or more node values being the same or similar). When node matching is performed, comparison of nodes with matching values may be used without matching those nodes to other nodes in the snapshot (e.g., when nodes 810A and 810B have the same or similar node value, they may be compared to each other without comparing to 812A-B or 814A-B). A distance calculation may be made on two pages (e.g., by comparing nodes within the two pages). In some examples, a hash function is applied to each node of a snapshot using one or more of HTML attributes (e.g., tag, class, text, src, or the like) or CSS attributes (e.g., background color, font size, or the like) may be used. For example, features from a DOM Tree may be used.

The distance calculation may be performed according to any one or more of the following equations.

Once each feature (e.g., zone or node) of both snapshots 804 and 806 is computed, features that have the same hash from both may be matched, and considered as the same zones (e.g., no change, such as 810A to 810B). Features that are not matched are either inserted (part of change) or deleted (part of change). For example, features 812A or 814A may be considered deleted and features 812B or 814B may be considered added, since they have different sizes and thus may have a different hash. The features 812A-B may include similar or same content, but because the feature had a change in size, it may be considered deleted (812A) and added (812B) for purposes of performing the distance calculation. In other examples, features 812A-B or 814A-B may have a same hash. For features 814A-B, there may be a change because the feature may have moved.

The distance calculation may include using the following: let $S_1=\{node_{11}, \ldots, node_{1n_1}\}$ be the snapshot 804 and $S_2=\{node_{11}, \ldots, node_{1n_2}\}$ be the snapshot 806. After matching, up to three sets of features may be identified including, common nodes: $C=\{n_1, \exists n_1 \in S_1, \exists n_2 \in S_2$ such that $hash(n_1)=hash(n_2)\}$, deleted nodes: $D=\{n_1, \forall n_2 \in S_2, hash(n_1) \neq hash(n_2)\}$, or inserted nodes: $I=\{n_2, \forall n_1 \in S_1, hash(n_1) \neq hash(n_2)\}$.

In an example, the following assumptions may be used: let $\Lambda_1$ and $\Lambda_2$ be the total number of zones of the snapshots 804 and 806. Let $\Lambda_d$ be the combined area of deleted nodes and $\Lambda_i$ the combined area of inserted nodes. The distance may be computed using the ratio of combined area of deleted and inserted compared to the size of snapshots, for example with Eq. 2 below:

$$\text{distance}(S_1, S_2) = \frac{1}{2}\frac{\Lambda_d}{\Lambda_1} + \frac{1}{2}\frac{\Lambda_i}{\Lambda_2} \qquad \text{Eq. 2}$$

In another example, the following assumptions may be used: let $N_1$ and $N_2$ be the total number of zones of the snapshots 804 and 806. Let $|D|$ be the number of deleted nodes and $|I|$ the number of inserted nodes. The distance may be computed using the ratio of combined area of deleted and inserted compared to the size of snapshots, for example with Eq. 3 below:

$$\text{distance}(S_1, S_2) = \frac{|D| + |I|}{N_1 + N_2}. \qquad \text{Eq. 3}$$

In yet another example, the following assumptions may be used: let $$TA_1 = \sum_{n \in S_1} \lambda_n$$

and $$TA_2 = \sum_{n \in S_1} \lambda_n$$

be the sum of areas of all nodes of respectively snapshot 804 and 806 where $\lambda_n$ is the area of the node n. Let $$TA_d = \sum_{n \in D} \lambda_n$$

be the sum of deleted nodes areas and $$TA_i = \sum_{n \in I} \lambda_n$$

be the sum of inserted nodes areas. The distance may be computed using the ratio of combined area of deleted and inserted compared to the size of snapshots, for example with Eq. 4 below:

$$\text{distance}(S_1, S_2) = \frac{TA_d + TA_i}{TA_1 + TA_2}$$

Once the distance is calculated, for example using any one or more of the above Eqs. 2-4, the distance may be compared to a threshold to determine whether a change in layout for the website has occurred. The calculated distance may be output, for example stored or displayed. In some examples, a graph, changelog, or visual depiction of layout change may be stored or displayed, for example as described below with respect to the example user interfaces of FIGS. 10A-10C.

Figure 9:
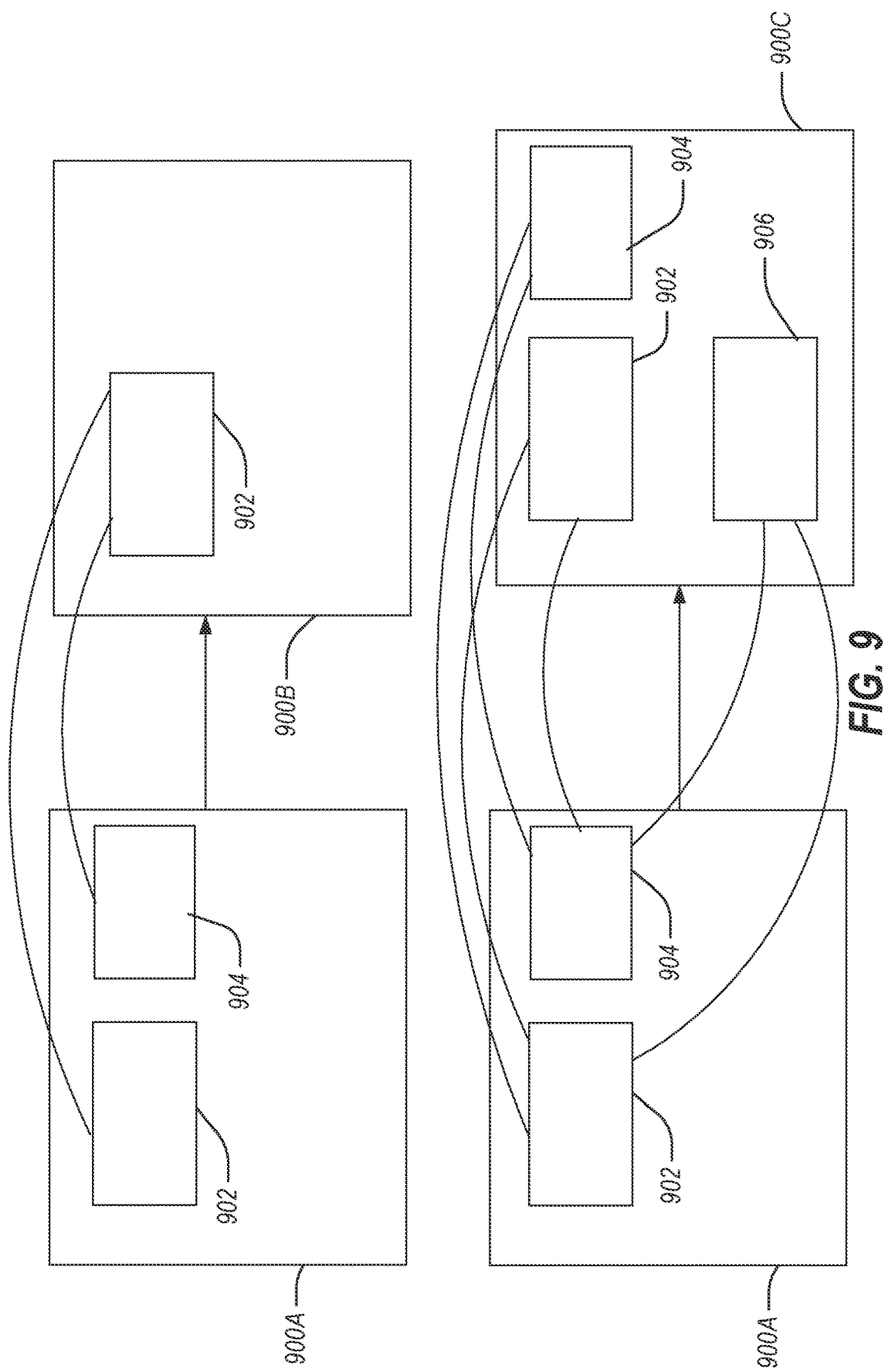
FIG. 9 illustrates a block diagram showing example website changes in accordance with some examples.

FIG. 9 illustrates a block diagram showing example website changes in accordance with some examples. The block diagram shows two example changes of a website from a first snapshot 900A to a second snapshot 900B or to a snapshot state 900C. The first state change from snapshot 900A to snapshot 900B shows optional comparisons from each feature in snapshot 900A to each feature in snapshot 900B. Snapshot 900A has feature 902, which appears in snapshot 900B in the same location on the website (e.g., feature 904 is unchanged). Snapshot 900A includes feature 904, which is missing from snapshot 900B (e.g., has been deleted). A change score for the changes between snapshot 900A and snapshot 900B may reflect the deleted feature 904 and the unchanged feature 902.

Snapshot 900C shows an added feature 906, in addition to non-changed features 902 and 904 from snapshot 900A. A change score for the changes between snapshot 900A and snapshot 900C may reflect the added feature 906 and the unchanged features 902 and 904. In some examples, each feature in snapshot 900A may be compared (e.g., via a distance calculation) to one or more features of snapshot 900C to determine a feature score (e.g., a feature distance score). In other examples, features of snapshot 900A are only compared to features in snapshot 900C that share a hash or other value. A lowest distance value may be used as the feature value for a particular feature. An overall change score may include a combination (e.g., sum or average) of the feature change scores for a snapshot. In an example, snapshot 900A may have a lower overall change score because it does not have feature 906. In this example, the higher overall change score may be used for snapshots 900A and 900C.

User Interfaces

Figure 10:
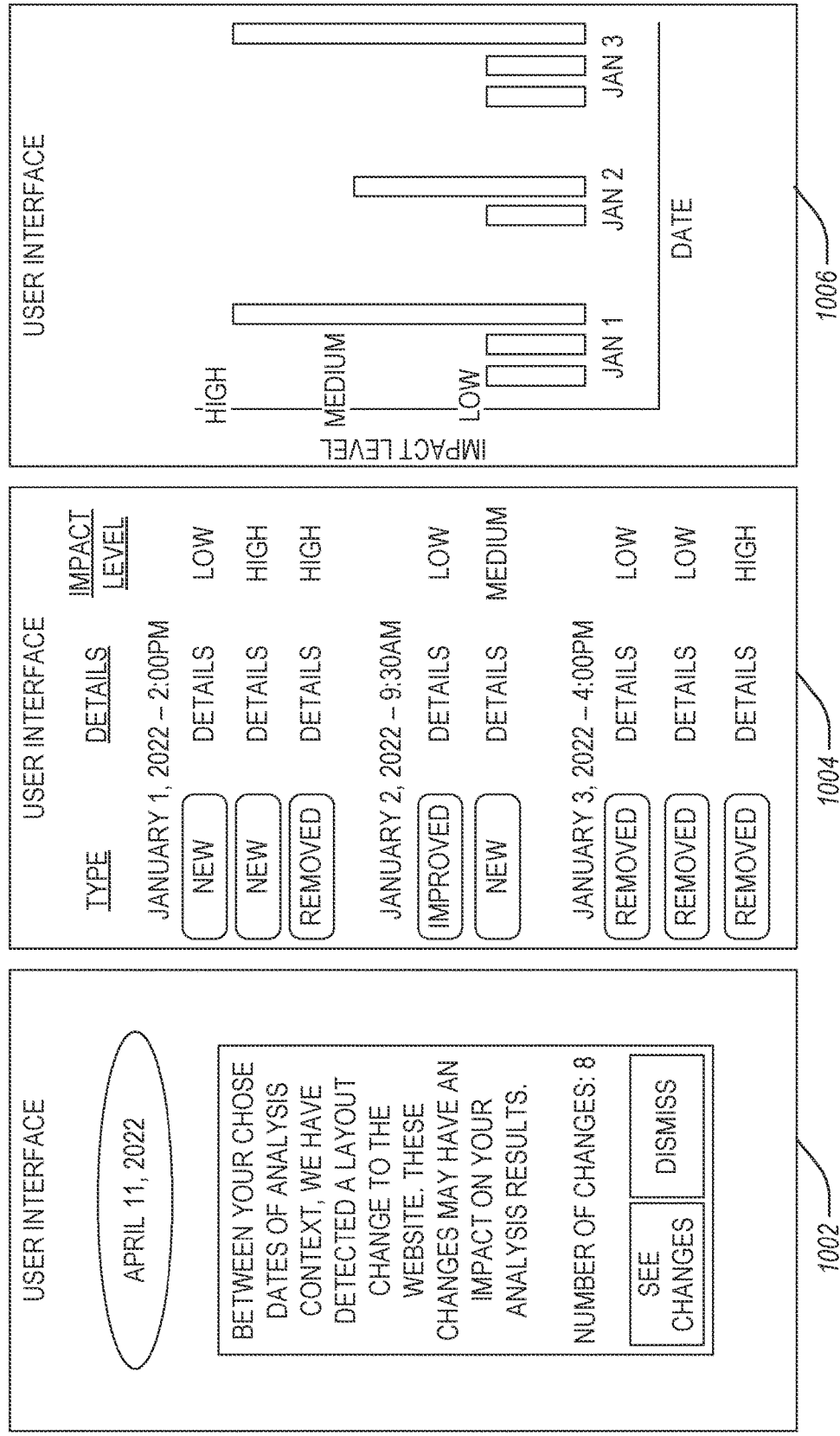
FIG. 10 illustrates example user interfaces for displaying website change information in accordance with some examples.

FIGS. 10A-10C illustrate example user interfaces for displaying website change information in accordance with some examples. A user interface 1002 shows an indication of a layout change (e.g., one that may impact a user-selected analysis). The indication may be displayed in response to a user selection, such as related to analytics for a website, or related to a user request for whether a layout has changed. The user interface 1002 may indicate a number of layout changes occurring on the website between two selected dates or since a selected date. The user interface 1002 includes selectable indications to see changes or to dismiss the indication of the layout change.

A user interface 1004 illustrates a changelog of a website. The changelog may be displayed in response to selection of the "see changes" selectable indication of user interface 1002, in some examples. The changelog may provide indications of what changes occurred in a layout, such as from a previous snapshot, which may be a previous day, a previously accessed day, a selected day, or the like. The changelog shown in the user interface 1004 includes details corresponding to each change, although this may be optional or available on selection by a user of the indication of the change. The user interface 1004 shows an optional impact level indicating how much of an impact the change has or is likely to have on a selected analytic, for example.

The change indications in the changelog on the user interface 1004 include "new" for added features, "removed" for deleted features, and "improved" for changed features. The impact levels are indicated as high, medium, or low, but may include more precise impact levels (e.g., on a scale, such as zero to ten or one hundred).

The changelog may include a notification that there is a change on a particular date (e.g., when the changelog is accessed to determine whether a change has occurred, or in response to a push notification, email, text, etc. that a change has occurred). In some examples, a note may be added to the changelog based on a threshold (e.g., only show changes that meet at least a minimum "low" threshold, for example). The impact levels or threshold may include a prediction of what changes may be relevant. The user may choose the threshold in some examples, or provide a custom list of features to identify changes for. Different features may have different thresholds (e.g., based on frequency of changes to website, degree of changes, etc.).

A user interface 1006 illustrates a graph of layout changes to a website. The graph may be displayed in response to selection of the "see changes" selectable indication of user interface 1002, in some examples. The graph may be accessed, in some examples, from the user interface 1004 (e.g., a selection on the changelog, such as a range of dates). In some examples, the graph may be selected (e.g., selecting a date, a bar, an impact level, etc.), and on selection, more detail may be provided on the selected indication (e.g., the user interface 1004 may be displayed, or only high impact changes may be shown, etc.). The graph may be pre-rendered, such as whenever a change occurs (which may be subject to thresholding in some examples). When there is a change, it may be stored, and when the user interface 1006 is to be rendered, the stored graph may be retrieved.

EXAMPLES

Example 1 is a method comprising: processing a first set of snapshots of a website corresponding to a first day, each of the first set of snapshots having a respective first set of features of the website for the first day; processing a second set of snapshots of the website corresponding to a second day, each of the second set of snapshots having a respective a second set of features of the website for the second day; comparing, using a processor, at least one of the respective first set of features to at least one of the respective second set of features using a distance function to determine a change score corresponding to at least one of a deleted feature, an added feature, or an unchanged feature of the website from the first day to the second day; and outputting the change score.

In Example 2, the subject matter of Example 1 includes, wherein comparing the at least one of the respective first set of features to the at least one of the respective second set of features using the distance function includes comparing each of the respective first set of features to each of the respective second set of features to determine a set of change scores.

In Example 3, the subject matter of Example 2 includes, wherein the change score is selected from the set of change scores having a minimum change score.

In Example 4, the subject matter of Examples 2-3 includes, wherein to determine the change score includes using minimum distance pairs between features of each of the respective first set of features to each of the respective second set of features.

In Example 5, the subject matter of Examples 1-4 includes, wherein the respective first set of features and the respective second set of features include frames identified from HTML code of the website.

In Example 6, the subject matter of Examples 1-5 includes, wherein the distance function compares respective hash values for each feature of the respective first set of features to respective hash values for the respective second set of features.

In Example 7, the subject matter of Examples 1-6 includes, wherein calculating the distance function includes: determining a first sum comprising: a sum of an area of deleted features from the respective first set of features plus a sum of an area of inserted features from the respective second set of features; determining a second sum comprising: a sum of areas of all features of the respective first set of features plus a sum of areas of all features of the respective second set of features; and dividing the first sum by the second sum.

In Example 8, the subject matter of Examples 1-7 includes, wherein the first set of snapshots of the website are captured at different times during the first day.

In Example 9, the subject matter of Examples 1-8 includes, wherein the respective first set of features and the respective second set of features correspond to features visible on the website when the website is initially loaded, with initially hidden features disregarded.

In Example 10, the subject matter of Examples 1-9 includes, wherein outputting the change score includes generating a graph of change scores over time, and displaying the graph on a user interface.

In Example 11, the subject matter of Examples 1-10 includes, wherein outputting the change score includes generating a changelog indicating changed features and displaying a subset of the changed features from the changelog based on a distance threshold corresponding to the changed features.

Example 12 is at least one non-transitory machine-readable medium including instructions, which when executed by processing circuitry, cause the processing circuitry to perform operations to: process a first set of snapshots of a website corresponding to a first day, each of the first set of snapshots having a respective first set of features of the website for the first day; process a second set of snapshots of the website corresponding to a second day, each of the second set of snapshots having a respective a second set of features of the website for the second day; compare at least one of the respective first set of features to at least one of the respective second set of features using a distance function to determine a change score corresponding to at least one of a deleted feature, an added feature, or an unchanged feature of the website from the first day to the second day; and output the change score.

In Example 13, the subject matter of Example 12 includes, wherein the operations to compare the at least one of the respective first set of features to the at least one of the respective second set of features using the distance function include operations to compare each of the respective first set of features to each of the respective second set of features to determine a set of change scores.

In Example 14, the subject matter of Example 13 includes, wherein the change score is selected from the set of change scores having a minimum change score.

In Example 15, the subject matter of Examples 13-14 includes, wherein to determine the change score includes using minimum distance pairs between features of each of the respective first set of features to each of the respective second set of features.

In Example 16, the subject matter of Examples 12-15 includes, wherein the respective first set of features and the respective second set of features include frames identified from HTML code of the website.

In Example 17, the subject matter of Examples 12-16 includes, wherein the operations to compare the distance function include operations to: determine a first sum comprising: a sum of an area of deleted features from the respective first set of features plus a sum of an area of inserted features from the respective second set of features; determine a second sum comprising: a sum of areas of all features of the respective first set of features plus a sum of areas of all features of the respective second set of features; and divide the first sum by the second sum.

In Example 18, the subject matter of Examples 12-17 includes, wherein the respective first set of features and the respective second set of features correspond to features visible on the website when the website is initially loaded, with initially hidden features disregarded.

In Example 19, the subject matter of Examples 12-18 includes, wherein the operations to output the change score include operations to generate a graph of change scores over time, and to display the graph on a user interface.

In Example 20, the subject matter of Examples 12-19 includes, wherein the operations to output the change score include operations to generate a changelog indicating changed features and to display a subset of the changed features from the changelog based on a distance threshold corresponding to the changed features.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method comprising:
processing a first set of snapshots of a website corresponding to a first day, each of the first set of snapshots having a respective first set of features of the website for the first day;
processing a second set of snapshots of the website corresponding to a second day, each of the second set of snapshots having a respective second set of features of the website for the second day;
comparing, using a processor, at least one of the respective first set of features to at least one of the respective second set of features using a distance function to determine a change score corresponding to at least one of a deleted feature, an added feature, or an unchanged feature of the website from the first day to the second day, the distance function measuring a change between an area of the website occupied by the at least one of the respective first set of features and an area of the website occupied by the at least one of the respective second set of features; and
outputting the change score.

2. The method of claim 1, wherein comparing the at least one of the respective first set of features to the at least one of the respective second set of features using the distance function includes comparing each of the respective first set of features to each of the respective second set of features to determine a set of change scores.

3. The method of claim 2, wherein the change score is selected from the set of change scores having a minimum change score.

4. The method of claim 2, wherein to determine the change score includes using minimum distance pairs between features of each of the respective first set of features to each of the respective second set of features.

5. The method of claim 1, wherein the respective first set of features and the respective second set of features include frames identified from HTML code of the website.

6. The method of claim 1, wherein the distance function compares respective hash values for each feature of the respective first set of features to respective hash values for the respective second set of features.

7. The method of claim 1, wherein calculating the distance function includes:
determining a first sum comprising: a sum of an area of deleted features from the respective first set of features plus a sum of an area of inserted features from the respective second set of features;
determining a second sum comprising: a sum of areas of all features of the respective first set of features plus a sum of areas of all features of the respective second set of features; and
dividing the first sum by the second sum.

8. The method of claim 1, wherein the first set of snapshots of the website are captured at different times during the first day.

9. The method of claim 1, wherein the respective first set of features and the respective second set of features correspond to features visible on the website when the website is initially loaded, with initially hidden features disregarded.

10. The method of claim 1, wherein outputting the change score includes generating a graph of change scores over time, and displaying the graph on a user interface.

11. The method of claim 1, wherein outputting the change score includes generating a changelog indicating changed features and displaying a subset of the changed features from the changelog based on a distance threshold corresponding to the changed features.

12. At least one non-transitory machine-readable medium including instructions, which when executed by processing circuitry, cause the processing circuitry to perform operations to:
process a first set of snapshots of a website corresponding to a first day, each of the first set of snapshots having a respective first set of features of the website for the first day;
process a second set of snapshots of the website corresponding to a second day, each of the second set of snapshots having a respective a second set of features of the website for the second day;
compare at least one of the respective first set of features to at least one of the respective second set of features using a distance function to determine a change score corresponding to at least one of a deleted feature, an added feature, or an unchanged feature of the website from the first day to the second day, the distance function measuring a change between an area of the website occupied by the at least one of the respective first set of features and an area of the website occupied by the at least one of the respective second set of features; and
output the change score.

13. The machine-readable medium of claim 12, wherein the operations to compare the at least one of the respective first set of features to the at least one of the respective second set of features using the distance function include operations to compare each of the respective first set of features to each of the respective second set of features to determine a set of change scores.

14. The machine-readable medium of claim 13, wherein the change score is selected from the set of change scores having a minimum change score.

15. The machine-readable medium of claim 13, wherein to determine the change score includes using minimum distance pairs between features of each of the respective first set of features to each of the respective second set of features.

16. The machine-readable medium of claim 12, wherein the respective first set of features and the respective second set of features include frames identified from HTML code of the website.

17. The machine-readable medium of claim 12, wherein the operations to compare the distance function include operations to:
determine a first sum comprising: a sum of an area of deleted features from the respective first set of features plus a sum of an area of inserted features from the respective second set of features;
determine a second sum comprising: a sum of areas of all features of the respective first set of features plus a sum of areas of all features of the respective second set of features; and
divide the first sum by the second sum.

18. The machine-readable medium of claim 12, wherein the respective first set of features and the respective second set of features correspond to features visible on the website when the website is initially loaded, with initially hidden features disregarded.

19. The machine-readable medium of claim 12, wherein the operations to output the change score include operations to generate a graph of change scores over time, and to display the graph on a user interface.

20. The machine-readable medium of claim 12, wherein the operations to output the change score include operations to generate a changelog indicating changed features and to display a subset of the changed features from the changelog based on a distance threshold corresponding to the changed features.

\* \* \* \* \*